April 9, 1929.  C. B. MOORE ET AL  1,708,231
DEVICE FOR SHIPPING AUTOMOBILES
Filed June 22, 1928
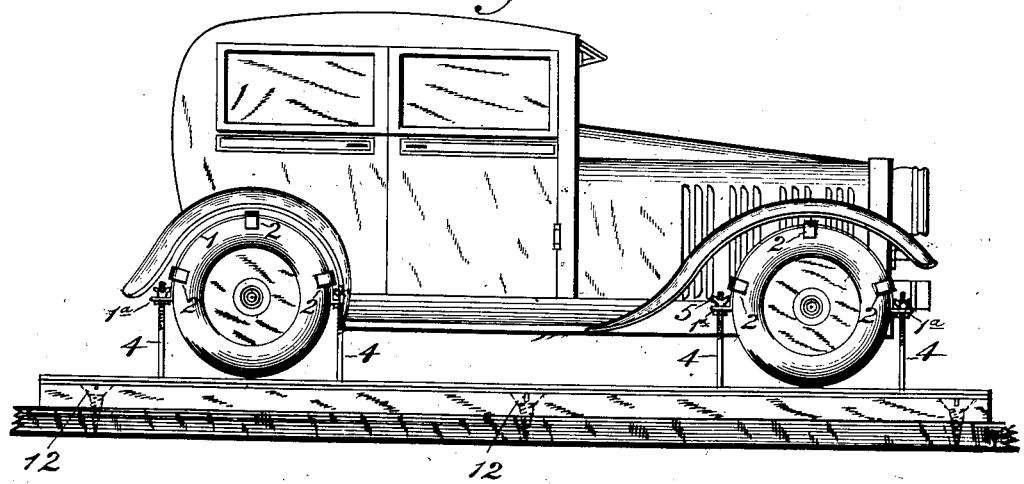
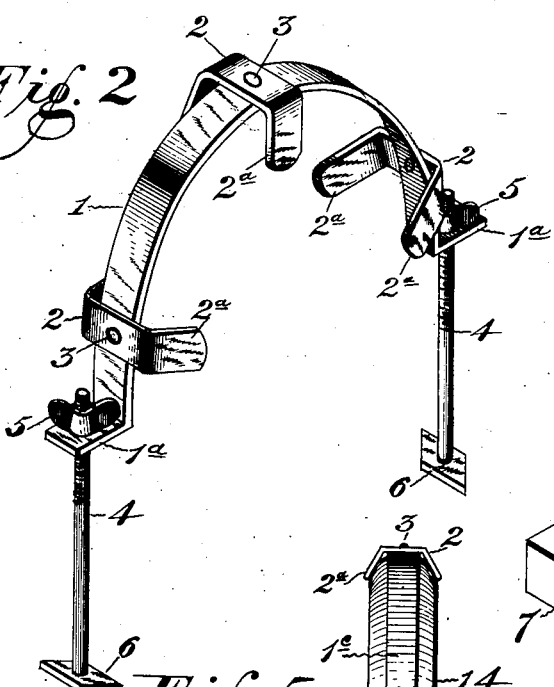
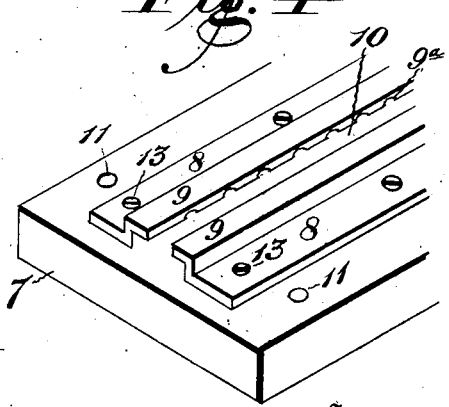
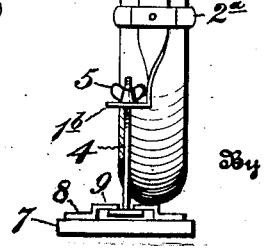
Inventors
Charlie B. Moore
and
James H. Sybert.
By E. E. Overholt,
Attorney Patented Apr. 9, 1929.

1,708,231

UNITED STATES PATENT OFFICE.

CHARLIE B. MOORE AND JAMES H. SYBERT, OF ALTOONA, PENNSYLVANIA.

DEVICE FOR SHIPPING AUTOMOBILES.

Application filed June 22, 1928. Serial No. 287,609.

Our invention relates to means for holding automobiles on cars, in rigid relation thereto, as it were, during shipment.

At present automobiles are usually secured on cars for shipment by means of wooden blocks which are very securely nailed to the floor of the car; so that in removing the blocks, the floor is often damaged to such an extent that the cars are no longer fit for the shipment of grain etc., till the floor is repaired. A very considerable expense is imposed upon the railroads in repairing the floors of cars, damaged and rendered unfit for ordinary use in the above way. The shipper is put to considerable expense in blocking the cars, and the considerable amount of material used for that purpose is a dead loss to him. Quite a little time and labor are also required to unload the automobiles from the cars. The more quickly this work is done by present methods, the greater will be the damage to the floor of the car. Hence it will be easily seen that the ordinary methods of shipment are expensive to the shipper, the dealer, and the railroad company.

With the method of loading herein set forth, the loading can be quickly and easily and economically done; and when it comes to unloading a carload of automobiles, one man can have them ready to move in about five minutes, whereas with the method now in common use, it takes three or four men about an hour. As to the floors of the cars, they are not materially damaged at all; so that there is a saving of both time and money all the way around.

The parts used in securing the automobiles, can be returned to the shipper for the next load; and so can be used over and over indefinitely. Hence, our object is, to provide a device for easily, quickly, and economically handling cars in shipment.

A leading feature of the invention consists of a pair of parallel bars spaced apart the same distance as are the wheels on the two sides of the automobile, and forming, as it were, tracks upon which the wheels rest. These tracks are provided on their upper sides with undercut grooves or their equivalents, which grooves are designed to engage securing means carried preferably by the wheels of the automobile. These tracks are in turn secured to the floor of the car in any suitable manner, and thus when the automobile is secured to them, form a connecting link between the automobile and the floor of the car to hold the automobile against movement relatively to the car. The securing devices, employed to engage the undercut grooves of the parallel tracks, are adapted to engage said grooves at any point in their longitudinal extent, so that the tracks are perfectly adapted to receive automobiles of different lengths.

Our invention also makes suitable provision for taking care of cars which are wider in the back than in the front; also for cars wider or narrower than the standard width.

The invention consists in certain novel features of construction and arrangement of parts, as will be hereinafter described and claimed, reference being had to the accompanying drawings, in which:—Fig. 1 is a side elevation of an automobile secured by our invention to the floor of a car ready for shipment.

Fig. 2 is a perspective view of the securing devices which we employ in connection with the wheels of the automobile.

Fig. 3 is a bottom plan view, on a somewhat enlarged scale, of the head of one of the bolts used with the securing device;

Fig. 4 is a broken perspective of one of the grooved tracks upon which the wheels of the automobiles rest, and to which they are secured; and, Fig. 5 shows a modified form of hold-down strap, (on a reduced scale), for taking care of wheels either wider apart or closer together than the standard width.

One of our devices is, as a rule, applied to each wheel of an automobile.

Referring further to the drawings, the numeral 1 indicates what may be termed the securing strap or the hold-down strap of our device. This strap is usually thin and made of springy material, and of a curvature to approximately conform to the curvature of the wheel with which it is designed to cooperate. At its ends this strap terminates in integral sections 1ª bent outwardly approximately at right angles to the main curved section. Between its ends, the strap 1 is provided with a plurality of cleats 2 suitably spaced from each other and rigidly secured to the convex portion of the strap by the rivets 3. These cleats have their ends 2ª bent inwardly toward each other, with an intervening space adapted to easily receive the automobile tire between them. The outwardly bent ends 1ª of the strap are provided with bores for the reception of bolts 4. These bolts are provided at their upper ends with wing-nuts 5, and at their lower ends with heads 6 shaped to form parallelograms of the type that are longer than they are broad, and with their angles arranged as shown in Fig. 3 of the drawings.

The track-bars 7 are preferably formed of wood, and are provided on their upper faces with parallel angle plates 8 which have their inner sides formed into the offset portions 9 which are spaced from each other a sufficient distance to easily receive between them the bolt-heads 6 their narrow way; which permits the bolt-heads to be entered into the slot 10 formed between the two plates 8. By reason of the arrangement of the offsets 9 of these bars, relatively to each other, the slot 10 may be termed an undercut slot, for the reception of the bolt-heads 6. The bars 7 are preferably provided with bores 11 for the reception of screws or bolts 12 (Fig. 1) for securely fastening the bars to the floor of the car. The angle plates 8 are secured to the bars 7 by screws 13.

In the slight modification illustrated in Fig. 5, the hold-down strap 1ᶜ is given a twist near its ends with its extreme ends 1ᵇ bent to one side, which brings the bolt 4 to one side of the centre of the tire and of the strap. This is the form of the device which we employ when the space between the centres of the tracks is different from the space between the wheels.

In operation the bars 7 are secured to the floor of the car parallel with each other so as to form two parallel tracks for the wheels of the automobile. The securing or hold-down strap 1 is placed over each tire, and is held against lateral displacement thereon by the cleats 2 with their inturned ends 2ª which lap the sides of the tire, as shown in Figs. 1 and 5 of the drawings. The bolt-heads 6 are entered their narrow way into the undercut slots 10 and are given a partial rotation to bring the ends of the bolthead under the overhanging sides 9 of the angle plates 8. Since the two shorter sides of the bolt-heads 6 are at an angle other than a right angle to the two longer sides, it will be seen that after the bolt-heads have been entered into the slots it will take only a slight turn to bring said shorter sides of the bolt into approximate parallelism with the longitudinal extent of the slot, so that with a turn less than one fourth of a revolution the bolt-heads will be strongly engaged underneath the overhanging flanges 9 of the plates 8. The wing-nuts 5 are then screwed securely down on the end projections 1ª of the securing strap 1. This, as will be seen, will securely bind the automobile to the floor of the car, so that it cannot move relatively thereto, either longitudinally or laterally. When the car is ready to be unloaded, the hold-down arrangement is simply removed from the wheels, and the autos are ready to be run out.

In railway cars used for nothing else but shipping automobiles, the tracks remain as a permanent part of the floors of the cars; but when it is desired to use the cars for other purposes, the bars 7 are easily loosed from the floors of the cars by removing the screws 12; and the entire hold-down arrangement is returned to the shipper ready to be used again.

With the slightly modified form of hold-down strap illustrated in Fig. 5, if this strap be used on a right-hand wheel, as shown in the illustration, the device will adapt itself to wheels that are wider apart than the tracks; but if the bent end 1ᵇ be made to extend to the right instead of to the left (as shown in the figure), then the device would accommodate itself to a pair of wheels that are closer together than the space between the centres of the tracks. In this connection attention is called to the fact that all that is necessary to make the end 1ᵇ extend in the opposite direction from that shown, is to reverse the ends of the strap on the wheel, putting the end of the strap that is now at the rear of the wheel, to the forward side of the wheel. Thus it will be seen that the same pair of hold-down straps may be used for a set of wheels that are farther apart than the ordinary, or for a set that are closer together than the ordinary, just as occasion may require.

It goes without saying, that the connections 4 may be replaced by flexible connections, if so desired, as for instance, a cable or chain might be substituted for the stem of the bolt 4.

From the foregoing it will be seen that we have provided a device of very simple and economical construction, which is of great utility for the purpose of securing automobiles on cars ready for shipment. One which is a great time and labor saver for both the shipper and the dealer; and which permits the cars to be quickly unloaded with the utmost ease; and withal does not occasion any appreciable damage to the floors of the cars in which shipment is made; and in addition to all this is a device which can be used over and over again indefinitely. Hence the great value and utility of our invention becomes fully apparent.

It is apparent that the angle plates 8 may be secured directly to the floor of the railway car, in which case the bars 7 would be dispensed with. In that case, the part 7, in Fig. 4 of the drawings, would represent the floor of the car.

It should be noted that the front and rear ends of each one of the hold-down devices are in alinement with the line of travel of the railway car, which is the line of strain on the auto in shipping it. That is to say; the two connecting bolts 4, at the front and rear of each wheel are in alinement with the line of travel of the railway car. Instead of the heads 6, the bolts 4, if desired, may be provided with T-heads which would engage the anti-slipping notches 9ª of the angle bars 9.

Having now described our invention, what we claim as new and desire to protect by Letters Patent is:—

1. In a device of the character described, a rigid longitudinally extending detachable support for the front and rear wheels of an automobile to be shipped, said support being mounted on the upper surface of the car floor; means for holding said support against horizontal movement relatively to the car; securing devices adapted to engage the wheels of the automobile, and arranged to extend downwardly to said support; and means extending longitudinally of said support and rigidly connected thereto and arranged for detachable engagement with said securing devices.

2. In a device of the character described, detachable track bars for the front and rear wheels of an automobile to rest upon; means for holding said bars against horizontal movement relatively to the floor of the car, said bars having undercut grooves on their upper faces; securing devices adapted to be attached to the wheels of the automobile and arranged to extend downwardly to said grooves and provided with means for detachable engagement therewith.

3. In a device of the character described, parallel track bars for the front and rear wheels of an automobile to be shipped, said bars being detachably mounted on the upper surface of the car floor; means for holding said bars against horizontal movement relatively to the floor of the car; hold-down straps for engaging the upper portion of the treads of the wheels, said straps being provided with means for holding them against lateral movement on said treads, said means consisting of transverse inwardly bent cleats for engaging the sides of the tires; adjustable connections at the ends of said straps extending downwardly therefrom to said track bars; and means carried on the upper face of said bars for detachable engagement with said connections.

4. In a device of the character described, a track for the front and rear wheels of an automobile to be shipped, said track being detachably mounted on the upper surface of the car floor; means for holding the track against horizontal movement relatively to the floor of the car; hold-down straps for engaging the upper portion of the treads of the wheels, said straps being provided with means for holding them against lateral movement on the treads; adjustable rotatable connections extending downwardly from said straps to said tracks, said connections having on their lower ends heads of greater length than width; and said track having on its upper face a longitudinal undercut groove of a width greater than the width of said elongated head, but of less width than the length thereof, whereby to adapt each head of said rotatable connections to be received its narrow way into said groove and then partially rotated to bring its ends under the sides of the undercut groove, the undercut portion of said groove being of a width not less than the length of said elongated head, whereby to cause said head when inserted into said groove and rotated therein, to be locked against upward movement out of the groove.

5. In a device of the character described for shipping autos on cars, the combination with a pair of opposing auto wheels of parallel tracks on the floor of the car; hold-down straps for engagement with the peripheries of the wheels; and connections between said straps and said tracks for holding the wheels against movement on the floor of the car, said connections engaging said straps at one side of the plane in which the straps are disposed.

6. In a device of the character described, hold-down straps for engagement with the peripheries of the wheels of an automobile; connections for securing said straps to the support upon which the auto rests, each of said straps having its two ends bent in the same direction in a plane disposed approximately at right angles to the plane of the main body of the strap; and said end sections being arranged for engagement with said connections.

7. In a device of the character described, detachable longitudinal track bars for the front and rear wheels of an automobile to be shipped, said bars being mounted on the upper surface of the car floor; means for holding the track against horizontal movement on the car, said bars having undercut grooves on their upper faces; and securing devices adapted to be attached to the wheels of the automobile and arranged to extend downwardly to said grooved bars, and provided with means for detachable engagement therewith.

8. In a device of the character described, the combination with a railway car having its floor provided with mating angle plates detachably secured thereto, of mechanism extending over the tops of the automobile wheels for holding the same against movement relatively to said plates; and detachable securing devices for connecting said mechanism with said mating plates.

9. In a device of the character described, the combination with a railway car having its floor provided with mating angle plates detachably secured thereto; of mechanism extending over the tops of the auto wheels for holding the same against movement relatively to said plates; and securing devices carried by said mechanism, and arranged to rotate into engagement with said mating plates, whereby to detachably connect said mechanism with said mating plates.

In testimony whereof we affix our signatures.

CHARLIE B. MOORE.
JAMES H. SYBERT.